United States Patent [19]

Shoup

[11] 3,970,557

[45] July 20, 1976

[54] IMPINGEMENT BAFFLE EQUIPPED OIL FILTER

[75] Inventor: Stephen G. Shoup, Peoria, Ill.

[73] Assignee: Caterpillar Tractor Co., Peoria, Ill.

[22] Filed: Feb. 13, 1975

[21] Appl. No.: 549,672

Related U.S. Application Data

[63] Continuation of Ser. No. 428,390, Dec. 26, 1973, abandoned.

[52] U.S. Cl............................. 210/130; 210/456
[51] Int. Cl.²...................................... B01D 27/10
[58] Field of Search........................... 210/130, 456

[56] References Cited
UNITED STATES PATENTS

| | | | |
|---|---|---|---|
| 2,170,074 | 8/1939 | Hewitt | 55/313 X |
| 2,870,914 | 1/1959 | Bloch | 210/456 X |
| 3,127,255 | 3/1964 | Wihslow | 210/130 X |
| 3,750,888 | 8/1973 | Rihaldo | 210/451 X |
| 3,855,127 | 12/1974 | Hakajima | 210/90 |

Primary Examiner—Frank A. Spear, Jr.
Attorney, Agent, or Firm—Phillips, Moore, Weissenberger Lempio & Strabala

[57] ABSTRACT

A system for filtering hydraulic fluid wherein a high flow rate of uncontaminated fluid is required. A housing having a paper filter element disposed therein is placed in a main oil flow line. The housing has a removable cover to which is fixed a rigid cylindrical baffle means which immediately confronts oil entering the inlet to the housing. With this arrangement cold, viscous oil entering the housing through the inlet thereof, which would normally tend to crush the paper filter element, impinges instead upon the cylindrical baffle means where its momentum is dissapated so that damage to the paper filter element is avoided.

5 Claims, 1 Drawing Figure

U.S. Patent  July 20, 1976  3,970,557
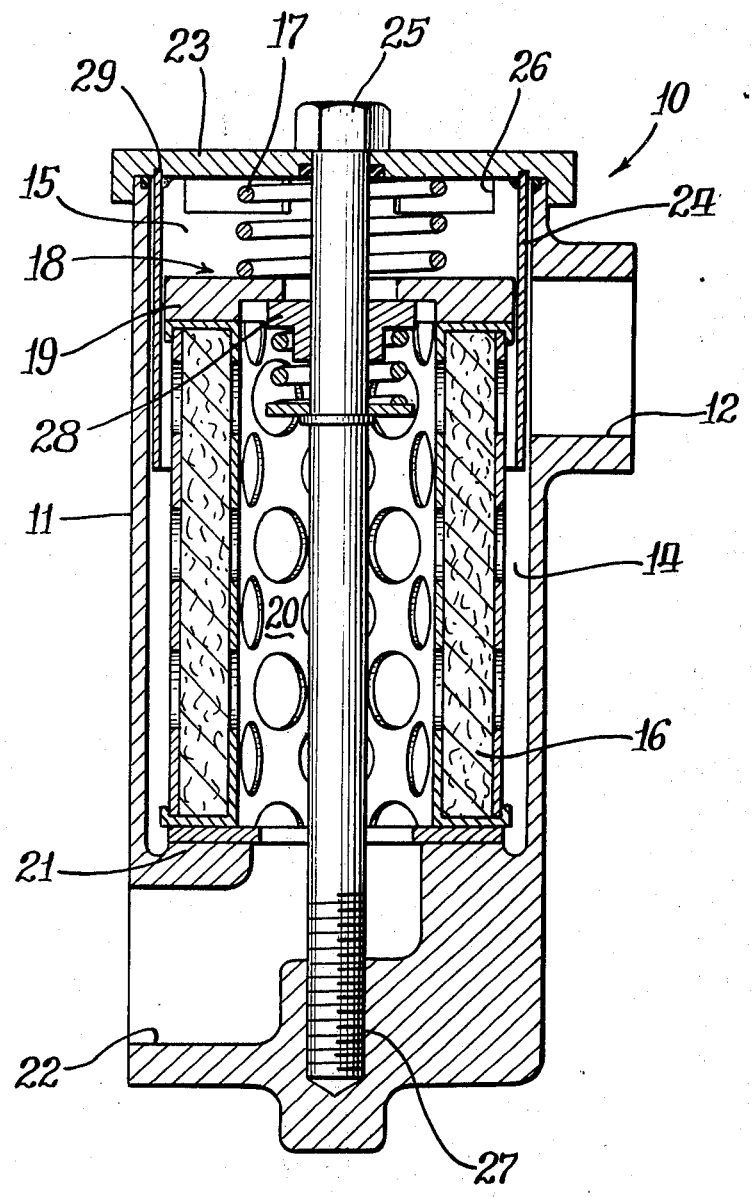

IMPINGEMENT BAFFLE EQUIPPED OIL FILTER

This is a continuation of Ser. No. 428,390, filed Dec. 26, 1973, now abandoned.

BACKGROUND OF THE INVENTION

In complex hydraulic filter systems wherein a large number of hydraulic components are utilized and wherein the functions of the components are interrelated, fluid filtration becomes an extremely important consideration. In such system, a very high flow rate is often required and it becomes imperative to assure that an extremely clean hydraulic fluid is utilized.

Such systems often utilize containers which retain paper filter elements therein which elements are periodically replaceable to assure that the system fluid remains uncontaminated. When such paper filter elements are utilized in a high flow rate system there is a possibility that the impingement of fluid on the element will crush or otherwise damage the element. This specification describes an invention primarily directed to avoiding such damage.

Some examples of prior art filter systems for both liquid and gaseous flow mediums are found in U.S. Pat. Nos. 3,058,594; 3,317,046; 3,358,835; 3,388,802; 3,390,780; 3,556,300; 3,572,508; 3,618,776; and Australian Pat. No. 247,762.

SUMMARY AND OBJECTS OF THE INVENTION

The instant invention provides a hydraulic filter arrangement which includes a cylindrical baffle means disposed adjacent the inlet to a filter housing for dissipating the energy of inlet fluid impinging thereupon to prevent damage to a paper filter element contained within the housing. The cylindrical impingement baffle is welded or otherwise affixed to a removable cover member for the housing which cover member allows replacement of the filter element and which cover acts as an abutment surface for a filter element retaining spring.

The main object of the present invention is to provide a filter assembly for a hydraulic system which includes baffle means for protecting a paper filter element from damage due to impingement of high velocity inlet fluid thereupon.

Other objects and advantages of the invention will become apparent from the following description and drawing.

BRIEF DESCRIPTION OF THE DRAWING

The sole FIGURE is a sectional elevation of the filter assembly of the present invention showing the operative parts thereof.

DETAILED DESCRIPTION

With reference to the drawing, the instant filter assembly is shown generally at 10. The assembly includes a housing 11 which has an inlet port 12 and an outlet port 22. Enclosed within the housing is a paper filter element 16 the purpose of which is to filter fluid entering the chamber 14 from the inlet 12 before allowing such fluid to pass into a central chamber 20 from whence it passes to the outlet 22 for system use.

The filter element 16 is held in position within the housing by means of a spring 17 which biases a valve seat plate 19 against an upper portion of the filter element and holds the filter element against a lower annular flange 21 of the housing. The spring 17 abuts a removable cover 23 which is sealingly retained upon the housing 11 by means of a bolt 25 having a threaded shank which fastens to the housing at 27.

The filter assembly is equipped with a by-pass arrangement, shown generally at 18, which includes a spring biased relief valve 28 which opens to allow unfiltered fluid to flow directly from the chamber 14 to the central chamber 20 at such times as the paper filter element becomes clogged or otherwise damaged and non-functional.

To prevent against damage caused by the impingement of high rate fluid from the inlet 12 directly upon the walls of the paper filter element 16, the filter assembly also provides a cylindrical impingement baffle 24. The impingement baffle projects across the entire longitudinal extent of the inlet 12 and takes the direct impact of fluid entering such inlet. Subsequent to the impingement of fluid and the concomitant dissipation of its kinetic energy, such inlet fluid is dispersed from the baffle to the lower confines of the chamber 14.

The impingement baffle is provided with a plurality of notches 26 which provide ample flow passage between the outer chamber 14 and the upper chamber 15 from whence fluid flows to the chamber 20 when the by-pass valve 28 opens. It should be noted that the baffle 24 is welded or otherwise affixed within an annular groove 29 in the cover member 23.

In view of the foregoing, it will be apparent that the present invention provides a filter assembly having impingement baffle means which effectively remove liquid impingement as a potential cause for collapse or damage to the filter element. The system is uncomplicated and economically performs the filtering and impingement protection functions required thereof.

While the invention has been described with particular reference to the preferred embodiment, it is apparent that variations and modifications are possible within the purview of the inventive concepts. No limitation with respect to such variations and modifications is intended, except by the scope of the appended claims.

I claim:

1. A filter assembly having a housing, a fluid inlet and a fluid outlet in said housing, filter element means disposed within said housing for filtering fluid passing from said inlet to said outlet, impingement baffle means disposed within said housing directly across from said fluid inlet and in the direct path of said fluid entering said housing through said inlet for shielding said filter element from direct impingement of said fluid entering said housing, said baffle means include a rigid cylindrical member, said rigid cylindrical member has notch means therein remote from said inlet for passage of fluid from the exterior to the interior of said cylindrical member by passage through said cylindrical member, separate removable cover means for said housing, said separate cover means not being a part of said housing and not containing said fluid inlet and fluid outlet, said impingement baffle means being integral with and removable with said cover means, said cover means including an annular cover member and bolt means for fastening said annular cover member to said housing.

2. The invention of claim 1 wherein said filter element means include a cylindrical filter element fabricated from paper.

3. The invention of claim 1 wherein said assembly includes by-pass valve means in said housing for permitting the selective passage of fluid from said inlet to said outlet without passage of said fluid through said filter element means.

4. The invention of claim 3 wherein said filter element means are retained within said housing by means of a plate member, and wherein a spring means is provided between said annular cover member and said plate member for biasing said plate member against said filter element means to retain said filter element means within said housing.

5. The invention of claim 1 wherein said annular cover member includes an annular groove and wherein said rigid cylindrical member is retained within said annular groove by means of welding.

* * * * *